United States Patent [19]

Ohara et al.

[11] Patent Number: 5,113,128

[45] Date of Patent: May 12, 1992

[54] BATTERY CHARGER AND CHARGING METHOD

[75] Inventors: Takeji Ohara; Yuuichi Yuasa, both of Fuchu, Japan

[73] Assignee: Ryobi Limited, Hiroshima, Japan

[21] Appl. No.: 597,584

[22] Filed: Oct. 15, 1990

[30] Foreign Application Priority Data

Oct. 18, 1989 [JP] Japan .................................. 1-272052

[51] Int. Cl.⁵ .............................................. H02J 7/00
[52] U.S. Cl. ........................................ 320/21; 320/31; 320/35; 320/39
[58] Field of Search ..................... 320/21, 31, 35, 39

[56] References Cited

U.S. PATENT DOCUMENTS

| | | | |
|---|---|---|---|
| 3,483,461 | 12/1969 | Schaefer | 320/31 |
| 4,035,709 | 7/1977 | Seider et al. | 320/23 |
| 4,079,303 | 3/1978 | Cox | 320/39 |
| 4,191,918 | 3/1980 | Nicholls | 320/23 |
| 4,388,582 | 6/1983 | Saar et al. | 320/20 |
| 4,392,101 | 7/1983 | Saar et al. | 320/20 |
| 4,549,127 | 10/1985 | Taylor et al. | 320/21 |
| 4,667,143 | 5/1987 | Cooper et al. | 320/35 |
| 4,779,035 | 10/1988 | Engelmann | 320/20 |
| 4,843,299 | 6/1989 | Hutchings | 320/31 |
| 4,849,682 | 7/1989 | Bauer et al. | 320/15 |
| 4,876,496 | 10/1989 | Duncan | 320/31 |
| 4,924,169 | 5/1990 | Shifflet et al. | 320/32 |

FOREIGN PATENT DOCUMENTS

| | | | |
|---|---|---|---|
| 1909727 | 3/1978 | Fed. Rep. of Germany | 320/21 |
| 1438290 | 6/1976 | United Kingdom | 320/39 |

*Primary Examiner*—Steven L. Stephan
*Assistant Examiner*—Thomas M. Dougherty
*Attorney, Agent, or Firm*—Darby & Darby

[57] ABSTRACT

A battery charger having a switching regulator is disclosed; an output of switching regulator is temporarily interrupted and the voltage of the battery is measured for detecting a completion of charge when the switching regulator is interrupted. The voltage of the battery can be measured accurately without switching noise and erroneous operation can be prevented.

3 Claims, 9 Drawing Sheets

BATTERY CHARGER AND CHARGING METHOD

BACKGROUND OF THE INVENTION

1. Field of the Invention

The present invention relates to a battery charger and charging method for charging batteries or the like, and more particularly to prevent undesirable operation thereof.

2. Description of the Prior Art

The charging of batteries such as nickel-cadmium cells, involves a problem relating to overcharge which may damage the batteries. A battery charger of prior art cuts-off a charging current by detecting a charge completion by measuring the voltage of the battery being charged.

Figure 1:
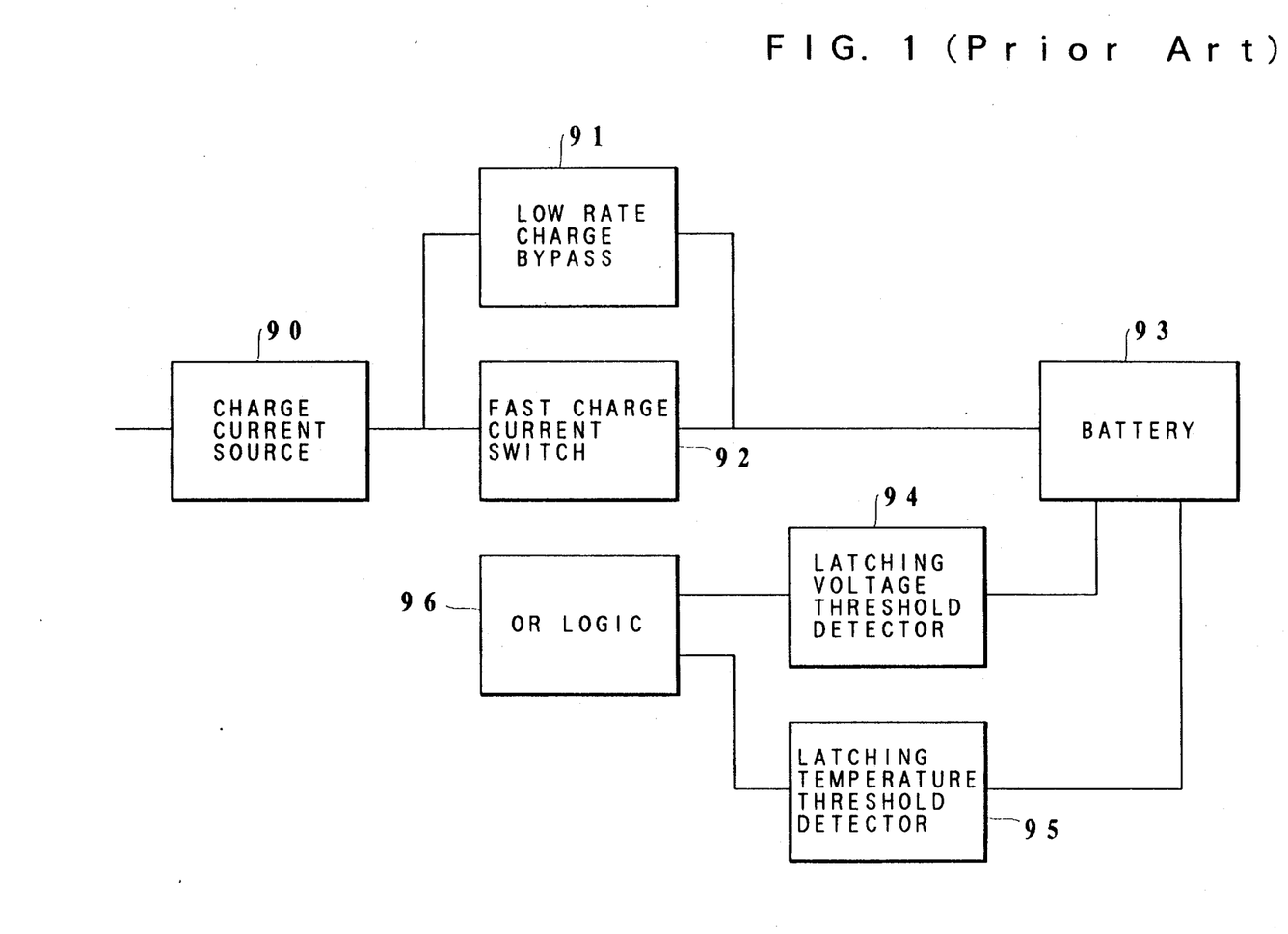

FIG. 1 shows a battery charger of the prior art described in U.S. Pat. No. 4,006,397. Current from a charge current source 90 is fed to a battery 93 through a fast charge current switch 92 such as relay. The fast charge current switch 92 is in turn controlled by an OR logic gate 96 which is in turn coupled to a temperature threshold detector 95 and a voltage threshold detector 94. The voltage threshold detector 94 senses the voltage of the battery 93 and feeds a corresponding signal back to the OR logic circuit 96. The logic circuit 96 compares the voltage received from the voltage threshold detector 94 to a reference voltage. When the received voltage from the voltage threshold detector 94 exceeds the reference voltage a signal is passed to the fast charge current switch 92 to disconnect the fast charge current path.

Figure 9:
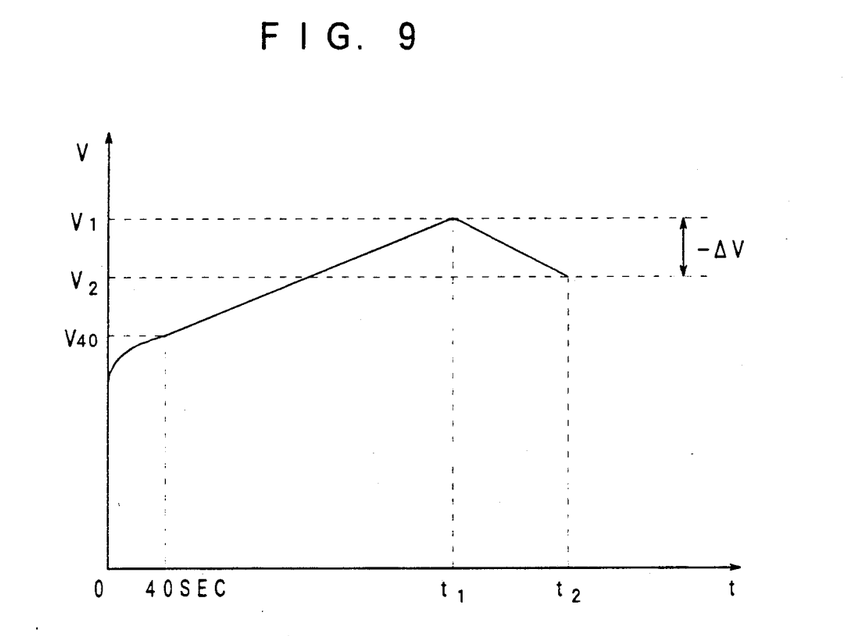
FIG. 9 is a graph for showing the relation between the charging time and the voltage of the battery.

Following is an example of the detection for charge completion of the battery in another prior art. As shown in FIG. 9, the voltage of the battery varies with elapsed time from start of the charging. In case of continuing the charging even after completing the charging (shown by a time $t_1$), the voltage of the battery slightly decreases. The decrease in voltage $-\Delta V$ is porportional to the number of cells in the battery. Therefore, the completion of the charging can be known by detecting the voltage decrease $-\Delta V$.

However, the prior art has not been able to use a switching regulator as a charge current source which enables use of a small transformer. This is because the switching regulator causes a noise on the detected voltage of the battery. The noise may make erroneous detection of charge completion, for example, erroneous charge termination in spite of no completion of charge or erroneous charge continuation in spite of completion of charge.

SUMMARY OF THE INVENTION

It is, therefore, an object of the invention to provide a battery charger having a switching regulator which is able to detect the completion of charge without error.

A battery charger in accordance with the present invention comprises:
  a switching regulator which produces a regulated output while carrying out high frequency switching and which stops the regulated output by receiving an interrupting signal,
  a transformer for transforming the voltage output of the switching regulator,
  cut-off means provided in power supply connection formed between a secondary winding of the transformer and a rechargeable battery, which cuts off the power supply connection by receiving a cut-off signal,
  an analog to digital convertor for converting a voltage of the rechargeable battery into digital data,
  control means which issues the interrupting signal having a predetermined time length to the switching regulator every predetermined interval, which reads out the output of the analog to digital convertor when the interrupting signal is issued and judges whether the charging is completed or not according to the output of the analog to digital convertor, and which issues the cut-off signal to the cut-off means when the charging is completed.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE DRAWINGS

FIG. 1 is a block diagram of a prior art battery charger of

DETAILED DESCRIPTION OF THE PREFERRED EMBODIMENTS

Figure 2:
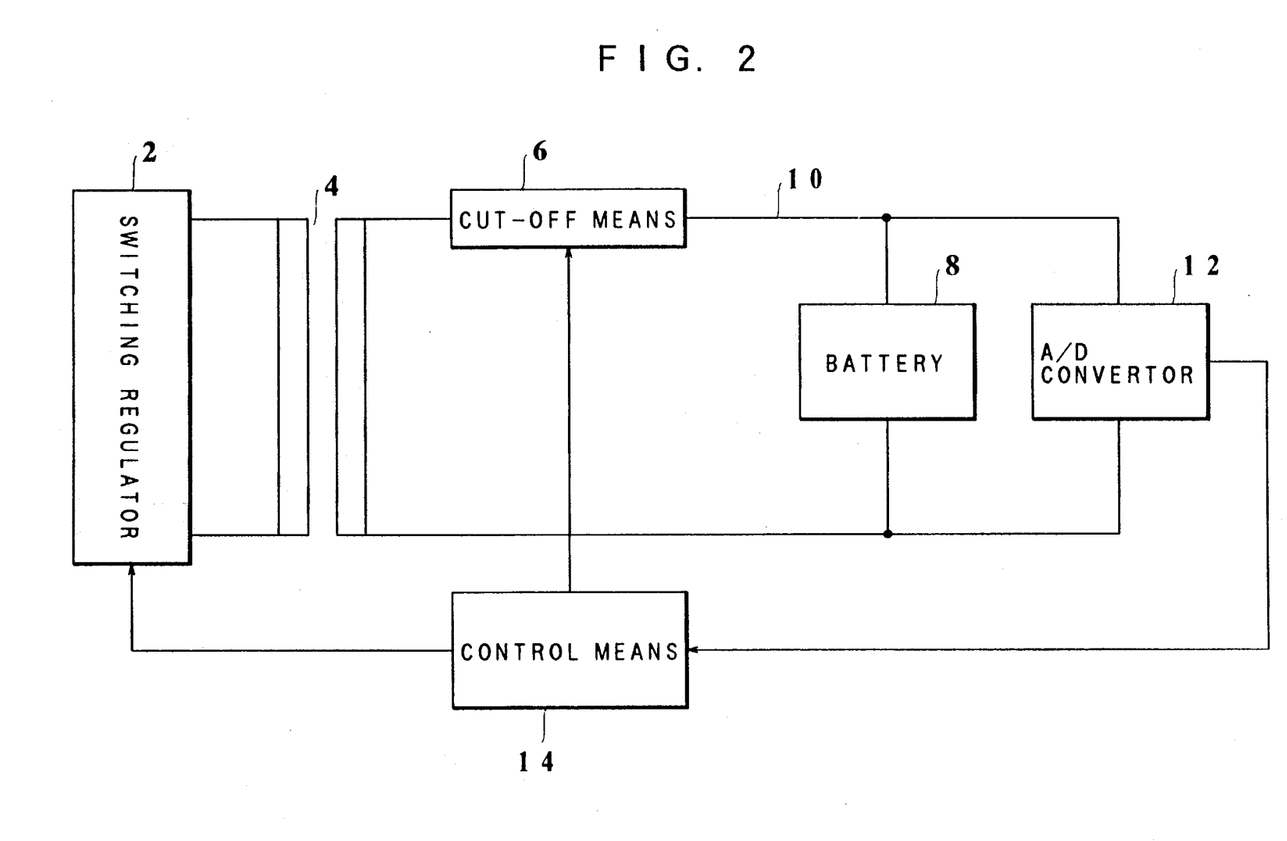
FIG. 2 and FIG. 3 are functional block diagrams of the battery charger embodying the present invention.

Referring to FIG. 2, the battery charger is illustrated in functional block diagrammatic form. When a battery 8 to be charged is inserted in a circuit 10, power is fed to the battery 8 from a switching regulator 2 through a transformer 4 and cut-off means 6. The battery 8 starts to charge. After initial waiting time elapsing from the start of charging, control means 14 issues an interrupting signal to temporarily stop the power supplied from the switching regulator 2. When the power supplied is stopped, the control means 14 reads out an output of the voltage charged state of the battery and from an analog to digital converter 12. Then the control means 14 judges whether the charging is completed or not. When the charging is not completed, the operation described above is repeated. When the charging is completed, the control means 14 issues a cut-off signal to cut off the power feeding path 10 by cut-off means 6. Therefore, it stops supplying the charging current on charging completion. Because the read out operation for the A/D converter 12 is carried out during the time of stopping the switching regulator 2, the erroneous operation caused by erroneous detection can be excluded.

Figure 3:
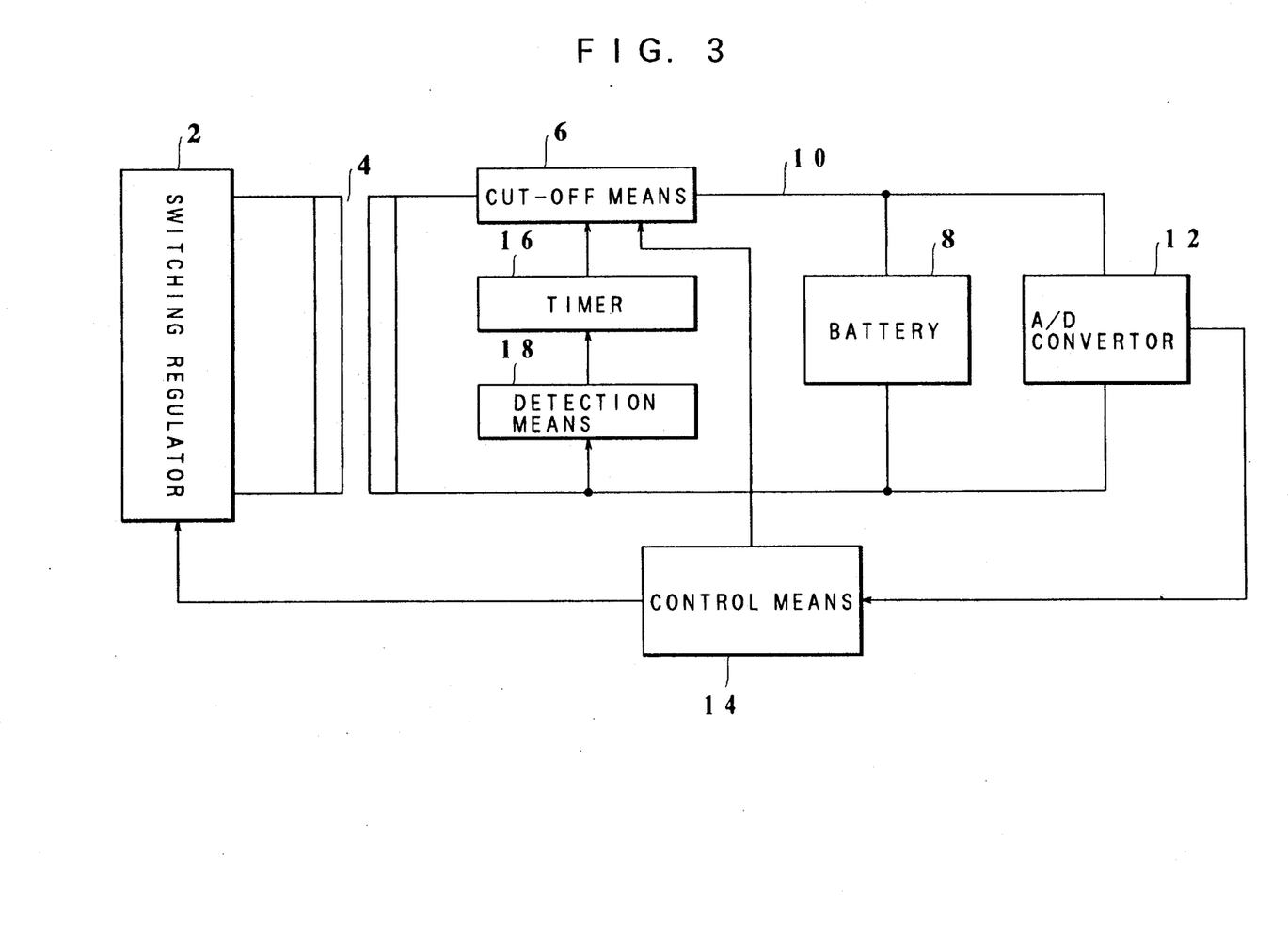

Another embodiment of the present invention is shown in FIG. 3. In this embodiment, a timer 16 and a detection means 18 are further provided. The timer 16 starts upon the start of current in the power supply path 10 and issues the cut-off signal after a predetermined timer time from the start. The timer 16 is reset in the case of no current in the power supply path 10. The predetermined timer time is longer than the interval of interrupting signal from the control means 14. Therefore, before completion of the predetermined timer time, the charging current is interrupted by the interrupting signal and the timer 16 does not issue the cut-off signal normally. However, in the case where the charging current is not interrupted by the abnormal operation of control means 14 etc., the timer 16 issues the cut-off signal to prevent the over-charge.

Figure 4:
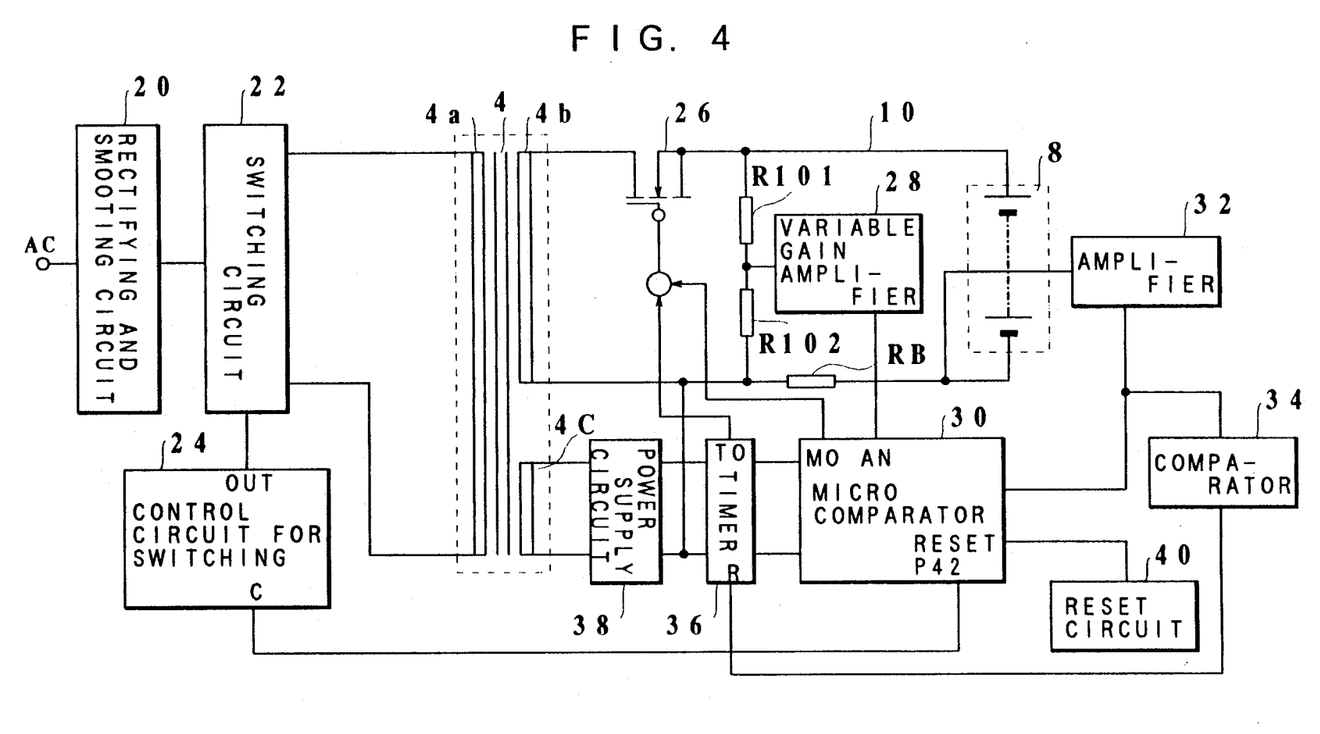
FIG. 4 is a block diagram of another embodiment of the battery charger of present invention.

FIG. 4 is a more detailed block diagram of the battery charger of FIG. 3. A switching regulator 2 comprises a rectifying and smoothing circuit 20, a switching circuit 22 and a control circuit 24 for switching. The rectifying and smoothing circuit 20 rectifies and smoothes alternating current from AC line source. The switching circuit 22 switches the rectified and smoothed output at a frequency of from ten to hundreds of cycles per second and applies the switched output to a secondary winding 4a of a transformer 4. The switching circuit 22 stops the output by receiving the interrupting signal from the control circuit 24 for switching. Therefore, the switching circuit 22 interrupts the power supply to the battery.

The transformer 4 comprises a primary winding 4a and secondary winding 4b. To the secondary winding 4b a transistor 26 as the cut-off means is connected. Through the transistor 26 a battery 8 to be charged is connected. A low level of a gate voltage signal to the transistor 26 cuts off the feeding path 10 to stop a charging current for the battery 8.

Resistor R101 and R102 for voltage dividing are connected in parallel to the battery 8. The divided voltage of the resistor R102 is applied to an input terminal AN of a microcomputer 30 through a variable gain amplifier 28. The variable gain amplifier 28 varies its gain by control from the microcomputer 30.

The microcomputer 30 also serves as an A/D converter which converts the applied voltage into digital data and processes the digital data. To stop the charging the microcomputer 30 produces an output MO in response to a low level. The output MO of the microcomputer 30 is applied to the gate of transistor 26. In other words, the low level of the output MO is used as the cut-off signal. An output P42 of microcomputer 30 issues the interrupting signal having low level in 6 m sec length with 3 sec interval. The interrupting signal is applied to a control input C of the control circuit 24.

A resistor RB for measuring the charging current providing in the charging path 10 is connected to an amplifier 32 for measuring the charging current for the battery 8. The output of amplifier 32 is applied to a comparator 34. The comparator 34 compares the applied voltage representative of the charging current with a reference value. The comparator 34 has a low level output on condition that the applied voltage is larger than the reference value and a high level output on condition that the applied voltage is smaller than the reference value. Detection means 18 is constituted by the amplifier 32 and the comparator 34.

The output of the comparator 34 is applied to a reset terminal of a timer 36. The timer 36 is started by low level output from the comparator 34 and reset by a high level output from the comparator. The timer circuit 36 has an output TO of a low level when the predetermined timer time elapses from the start. The output TO is applied to the gate of the transistor 26. The low level output from terminal TO is used as a cut-off signal.

To the microcomputer 30 and the timer 36, power is supplied from a power supply circuit 38. A reset circuit 40 is provided for initializing the microcomputer 30.

FIG. 4 shows a flow-chart of program stored in the microcomputer 30. The microcomputer 30 controls each part of the circuit according to the flow-chart.

Figure 5:
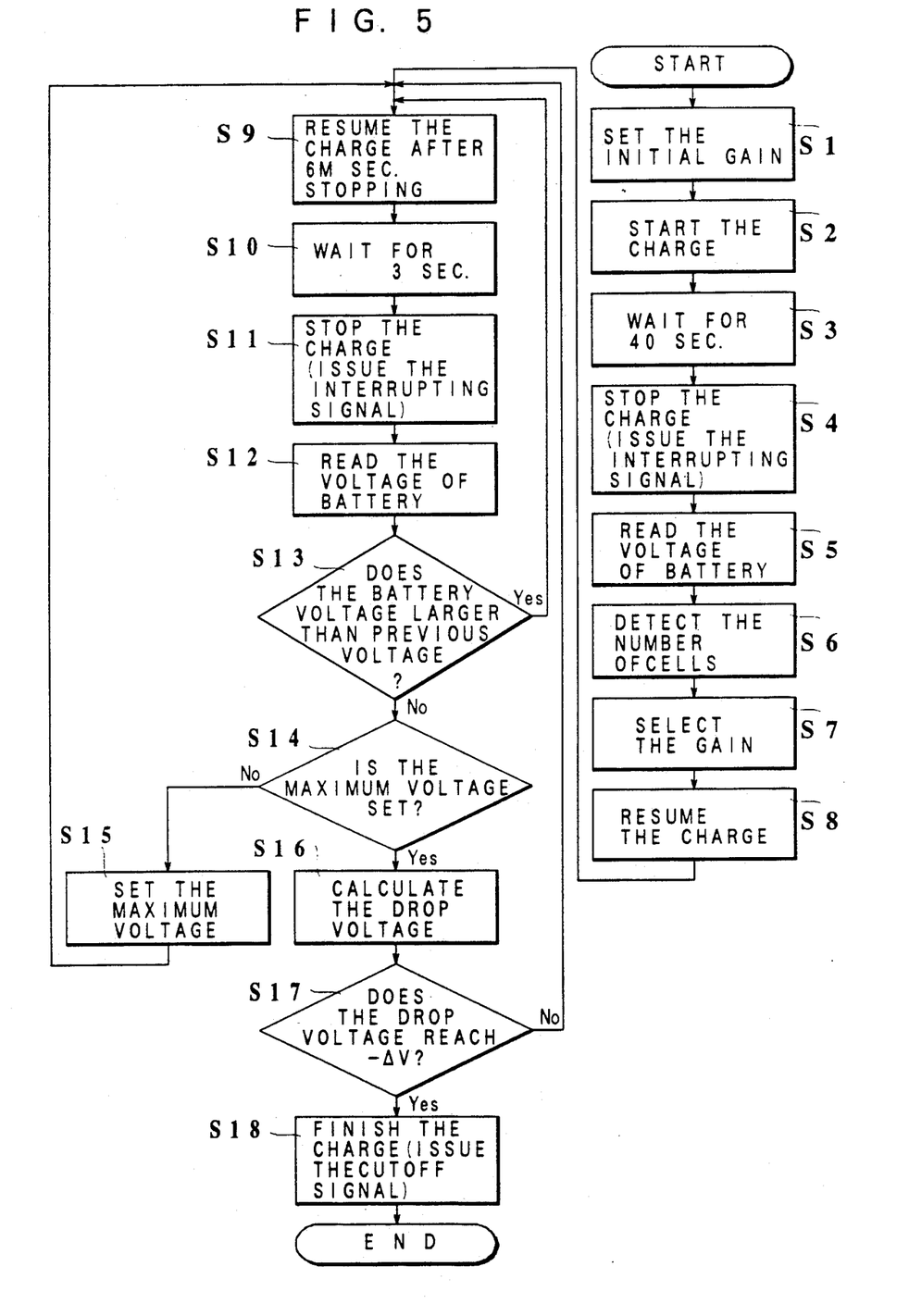
FIG. 5 is a flow-chart of the program stored in the microcomputer 30.

Steps $S_1$ to $S_7$ are provided for detecting a nominal voltage of the battery 8 and following steps are provided for judging the charge completion. First, the steps $S_1$ to $S_7$ for detecting the nominal voltage of the battery 8 are described below.

Figure 10:
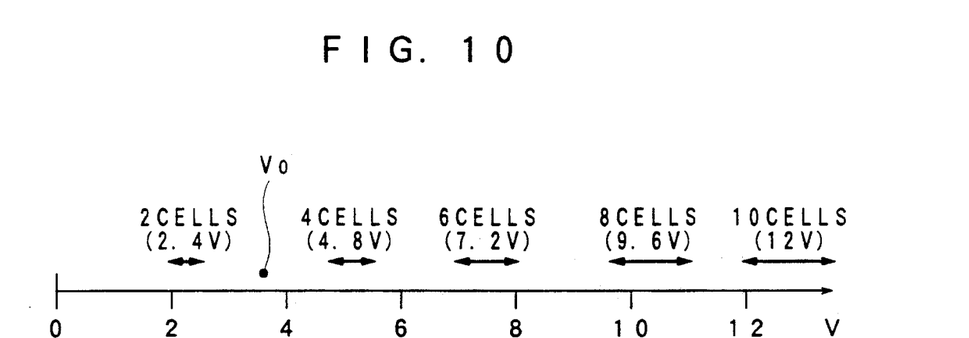
FIG. 10 is a diagram showing the relation between the number of cells and the voltage of the battery.

The battery is classified by nominal voltage according to the number of cells therein. A single cell has a nominal voltage of 1.2 volt. Usually, batteries having nominal voltage of 2.4 volt (2 cells), 4.8 volt (4 cells), 7.2 volt (6 cells), 9.6 volt (8 cells) and 12.0 volt (10 cells) are used. FIG. 9 shows the relation between the charging time and the voltage of the battery 8. As shown in FIG. 9, the voltage of the battery 8 rapidly rises in about 40 sec from the start of charging. FIG. 10 shows the relation between the voltage of battery in 40 sec elapsed and the nominal voltage after 40 seconds of charging, the voltage of a battery with the given number of cells will be less than the nominal fully shaped voltage but higher than the fully charged voltage of a battery with the next fewer number of cells. For example, FIG. 10 shows a 10 measurement of something less than 4 volts for a four cell battery having a fully charged voltage of 4.8 volts. The about 4 volt level is higher than the 2.8 volts of a fully charged 2 cell battery. As shown in FIG. 10, by the voltage of the battery 8 in 40 sec elapsed the number of cells is identified.

$-\Delta V$ for detecting the completion of charge varies in proportion to the number of cells ($-15$ mV per each cell). Therefore, the completion of charge can be detected accurately by determining the number of cells.

Referring to FIG. 4, upon inserting the battery 8 the microcomputer 30 is reset to start the charge. At this time, the microcomputer 30 selects the gain of variable gain amplifier 28 as minimum (step $S_1$). Because the microcomputer 30 is able to select the gain from 2 times, 2½ times, 3⅓ times, 5 times or 10 times in this embodiment, 2 times gain is selected as initial gain. To select the minimum gain as initial gain prevents undesirable overflow of the A/D converter built in the microcomputer 30 even for a battery 8 having 10 cells.

After elapsing 40 seconds from the start of charge (step $S_3$), the microcomputer 30 issues the interrupting signal from the terminal P42 (step $S_4$). Upon receiving the interrupting signal, the control circuit 24 for switching stops the output of switching circuit 22. In other words, the charging current for the battery 8 is stopped. When the output of switching circuit 22 is stopped, the microcomputer 30 reads out the output of variable gain amplifier 28 and converts it into digital data (step $S_5$). The voltage of battery 8 is divided into one-tenth by dividing resistor R101 and R102 and the gain of amplifier 28 is selected to be 2 times. Therefore, the microcomputer 30 reads out 0.2 of the voltage of battery 8.

The microcomputer 30 judges the number of cells of the battery 8 according to the read out voltage (step $S_6$). Then, the microcomputer 30 selects a desirable gain of the variable gain amplifier 28 according to detected number of cells (step $S_7$). The relation between the number of cells and gain is shown in following table:

TABLE 1

| Number of cells | Nominal voltage (V) | Gain of amplifier 28 | Whole gain |
| --- | --- | --- | --- |
| 2 | 2.4 | 10 | 1 |
| 4 | 4.8 | 5 | 1/2 |
| 6 | 7.2 | 3⅓ | 1/3 |
| 8 | 9.6 | 2½ | 1/4 |
| 10 | 12.0 | 2 | 1/5 |

As shown above, an input voltage to the A/D converter built in the microcomputer 30 is kept with approximately same range (2.4 V) by selecting the gain according to the number of cells. In other words, the circuit operates with a battery having 2 or more cells.

Then the microcomputer 30 stops the interrupting signal to resume the charge (step $S_8$). In the above mentioned processing time, the switching circuit 22 stops the output and the output of power supply circuit 38 coupled to the secondary windings 4c of transformer 4 stops. Because the stop time of the power supply circuit 38a is few msec, adequate power is supplied to the microcomputer 30 by the capacitor of power supply circuit 38. Therefore, the microcomputer 30 can normally operate even in the stop time of the power supply 38.

After detecting the number of cells as described above, it is detected to complete the charge or not. First, the microcomputer 30 gives the interrupting signal to the control circuit 24 for interrupting the charge. During the interrupting, the microcomputer 30 reads the output of amplifier 28 (step $S_{12}$). The microcomputer 30 judges whether the voltage of the battery (the output of amplifier 28) is larger then previous by measuring voltage of battery of not (step $S_{13}$). When the voltage of battery is larger than previous voltage, the charged voltage has not yet reached maximum voltage and accordingly the step is returned to $S_9$. When 6 msec has elapsed from the start of interrupting, the microcomputer 30 stops the interrupting signal to resume the charge. When 3 sec elapses from resuming the charge (step $S_{10}$), microcomputer 30 issues the interrupting signal to interrupt the charge (step $S_{11}$). The same operation is repeated. The microcomputer 30 reads the voltage of battery when the interrupting signal is issued. Therefore, the erroneous detection caused by switching noise can be excluded.

The microcomputer 30 continues the operation described above and stores the maximum voltage when the voltage of battery is smaller than the previous by measured (steps $S_{13}$, $S_{14}$ and $S_{15}$). Then the microcomputer 30 calculates a drop voltage from the maximum voltage (the maximum voltage −present voltage) (step $S_{16}$). When the drop voltage reaches a predetermined voltage (−30 mV in this embodiment), the microcomputer 30 gives the cut-off signal to the transistor 26 (steps $S_{17}$ and $S_{18}$). In response to the cut-off signal the transistor 26 turns off and the charging current to the battery 8 is cut off.

The completion of charge is detected as described above and the charge is stopped. While in this embodiment the completion of charge is detected by $-\Delta V$, the other detection such as absolute voltage detection can be applied in other embodiments. When a large capacity A/D converter is used, the voltage of battery 8 can be measured without the variable gain amplifier 28.

Operation of the timer 36 will be described below. The timer 36 is provided for protecting the battery 8 from over charge caused by fault of microcomputer 30. The timer 36 starts the timer operation by L level of reset terminal R and outputs the cut-off signal from the output TO upon elapsing of the predetermined timer time (in this embodiment 2 minutes) from the start of timer operation. When the reset terminal R assumes H level during the timer operation, the timer 36 stops the timer operation and reset a counter for timer operation. To the reset terminal R the output of the comparator 34 is given. The comparator 34 issues an L level signal for charging current and an H level signal for no charging current as described above. Therefore, the timer 36 starts upon starting of charging current. When the microcomputer 30 operates normally, the charging current is interrupted every 3 seconds. Therefore, an H level signal is impressed to the reset terminal R to reset the timer 36 and so that the cut-off signal is not issued from the timer 36. However, when the microcomputer 30 abnormally operates and does not issue the interrupting signal to the control circuit 24, the charging current is continuously flowing. The timer 36 does not reset and issues the cut-off signal after 2 minutes from the timer start. By the cut-off signal the transistor 26 turns off and the charging current stops. As described above, this prevents destruction of the battery by over charge even when the microcomputer 30 operates abnormally.

Figure 6:
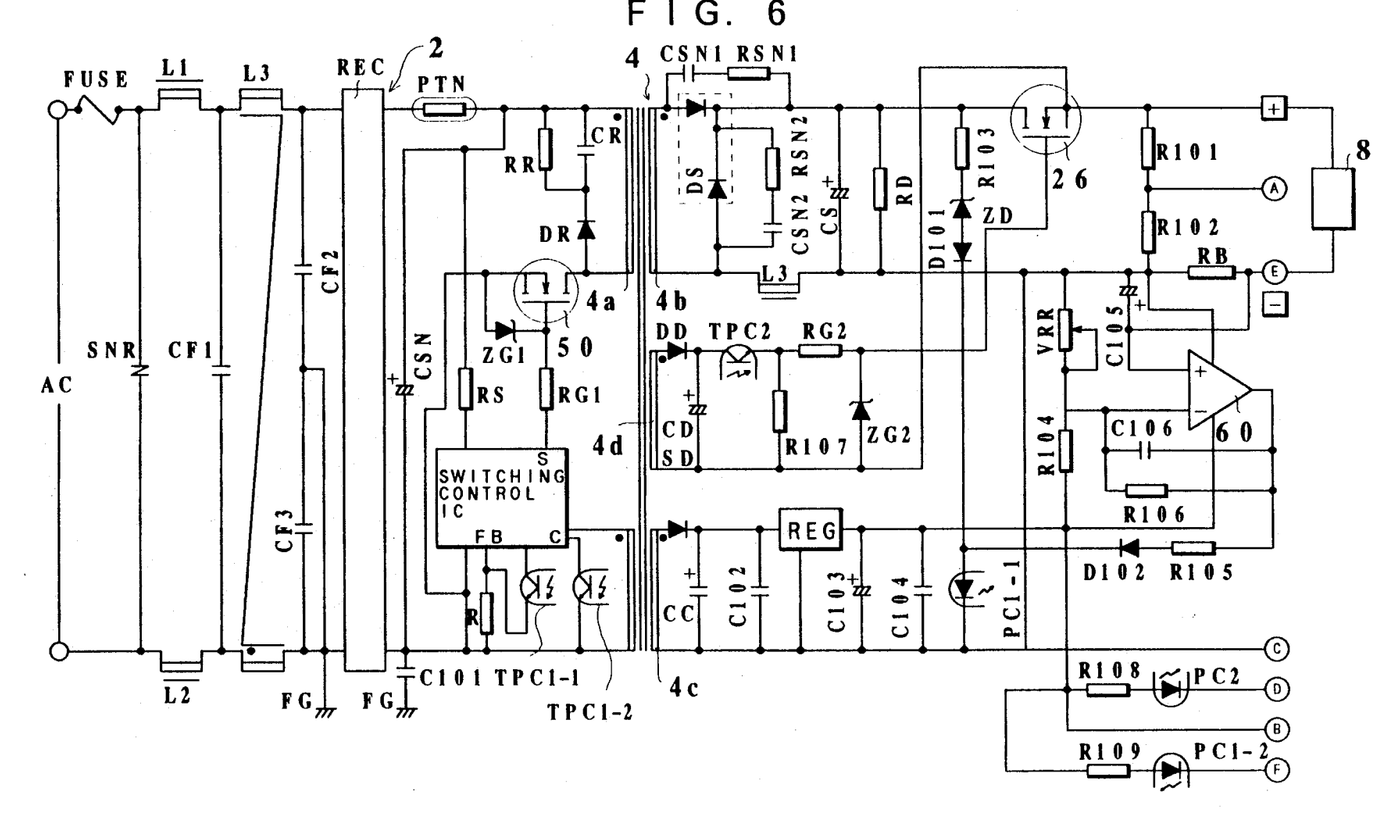
FIG. 6 and FIG. 7 show the detailed circuit of the battery charger of the present invention.
Figure 7:
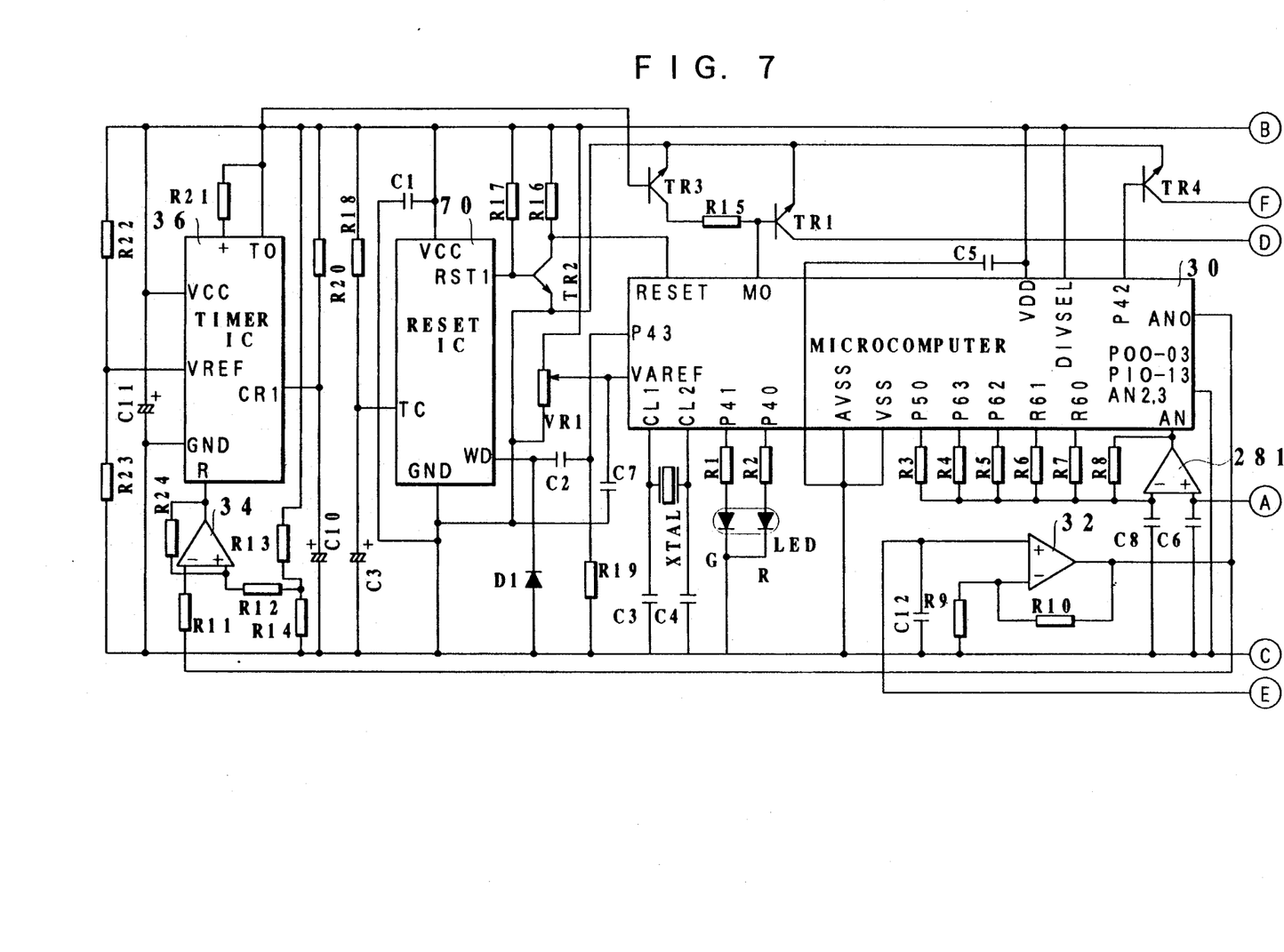

FIG. 6 and FIG. 7 show the detailed circuitry of FIG. 4. FIG. 6 shows the circuitry near the switching regulator 2, the transformer 4 and the battery 8. AC voltage is rectified and applied to the primary windings 4a of transformer 4 through the transistor 50 forming the switching circuit. A gate of transistor 50 is coupled to the switching output of switching IC 52. The switching IC 52 outputs the high frequency pulse from the switching output S. Therefore, the high frequency switched voltage is applied to the primary windings 4a.

The voltage between the terminals of battery 8 is divided by the resistors R101 and R102 and applied on a terminal A voltage. The terminal A is coupled to terminal A of FIG. 7. In FIG. 7, the voltage of the terminal A is applied to an operational amplifier 281. The output of the operational amplifier 281 is applied to the input terminal AN of the A/D converter of microcomputer 30. One ends of each of the resistors R3, R4, R5, R6 and R7 is coupled to the operational amplifier 281 and other ends of the resistors are coupled to ports P50, P63, P62, P61 and P60 of microcomputer 30. The microcomputer 30 grounds one of the ports P50, P63, P62, P61 and P60. By this control, the gain G is selected as follows:

$$G = 1 + R8/r$$

where r is resistance value of selected resistor from R3, R4, R5, R6 and R7.

The microcomputer 30 outputs an L level signal from the output port P42 and an H level signal (the interrupting signal) during 6 msec at every 3 sec interval. The H level signal of output port P42 acts to turn on the transistor TR4. By turning on the transistor TR4, a terminal F becomes an L level and a light emitting diode PC1-2 in FIG. 6. emits light. Then a photo transistor TPC1-2 coupled to control input C of switching control IC 52 turns on and the control terminal C becomes an L level. By receiving the L level signal the switching control IC 52 produces an L level of switching output S to turn off the transistor 50. Therefore, the microcomputer 30 issues an H level signal (i.e. the interrupting signal) from the output port P42 so that the output of the switching regulator is stopped.

The microcomputer 30 issues an L level signal as the cut-off signal from a port MO. The L level of port MO acts to cut off the transistor Tr1. Then a light emitting diode PC2 (in FIG. 6) coupled to a terminal D emits no light. Therefore, a photo transistor TPC2 is cut off and also the transistor 26 is cut off. As described above the charge is stopped.

A timer 36 is shown in left side of FIG. 7. A reset terminal R of timer 36 is coupled to an output of comparator 34. To an one input terminal of the comparator 34, a voltage divided by resistors R13 and R14 is applied as a threshold voltage. To the other input terminal of the comparator 34 the output of amplifier 32 is impressed. To the amplifier 32, a value of current flowing the resistor RB (in FIG. 6) is applied. When the charging current is larger than the threshold value, the comparator 34 produces an L level. When the charging current is smaller than the threshold value (no charge current), the comparator 34 has an H level. The timer IC 36 is started by an L level signal of comparator 34 and is reset by an H level signal of comparator 34. In other words, the timer IC 36 is started by the start of charging current and is reset by the stop of charging current.

In FIG. 6, an error amplifier 60 produces a differential voltage between the voltages of reference resistor VRR and the resistor RB and applies it to light emitting diode PC1-1. When the current through the resistor RB is larger than the predetermined value according to the reference resistor VRR, the brightness of light emitting diode PC1-1 increase. When the current through the resistor RB is smaller than the predetermined value, the brightness of light emitting diode PC1-1 decreases. The light emitting diode PC1-1 is optically coupled to a base of photo transistor TPC1-1 connected to the switching control IC 52. The switching control IC 52 varies the duty cycle ratio of switching output S by the voltage of terminal FB to maintain the effective value of charging current constant.

A reset IC 70 in FIG. 7 is provided for resetting the microcomputer 30 by detecting its abnormal operation. When the microcomputer 30 operates normally, a pulse for interruption is issued from the port P43. The reset IC 70 receives the pulse through an input terminal WD. When the microcomputer 30 operates abnormally, and accordingly no output is issued from the port P43, the reset IC 70 outputs the reset signal from the terminal RST1. By the reset signal, the microcomputer 30 is reset.

Figure 8:
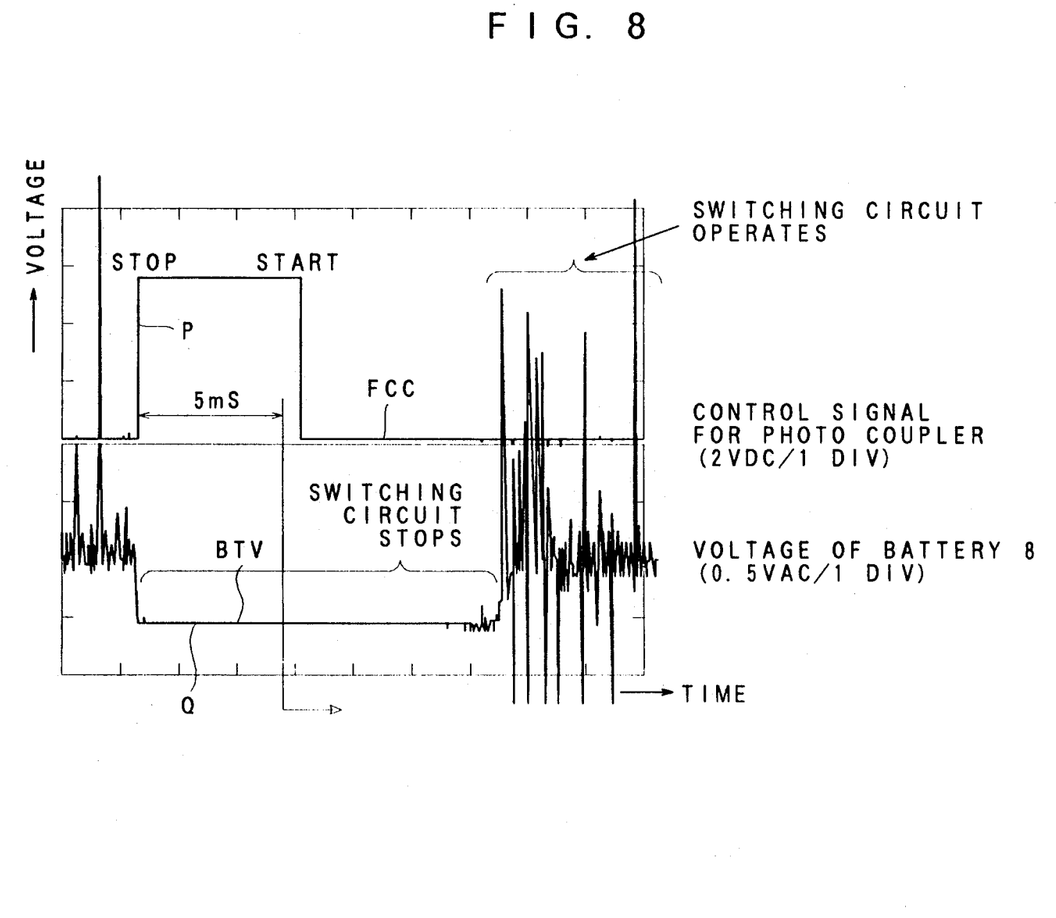
FIG. 8 is a graph showing the operation of the battery charger of the present invention.

FIG. 8 shows wave-forms of signals when the microcomputer 30 receives the voltage of battery 8 in the embodiment of FIG. 6 and FIG. 7. A wave form FCC shows the interrupting signal (voltage of terminal F) and a wave form BTV shows the voltage of battery 8. A unit scale is 2 volt for the wave form FCC and 0.5 volt for the wave form BTV. When the switching circuit, i.e. the transistor 50 operates the voltage of battery 8 varies and is unstable being influenced by the switching. However, the voltage of battery 8 is stable as shown in Q when the switching is stopped by rising edge P of the wave form FCC. Further, the noise caused by switching can be excluded. The microcomputer 30 receives the voltage of battery 8 in the stable period (in this embodiment, 5 msec after interrupting). Therefore, the erroneous detection can be prevented.

As described above, according to the present invention, a small sized battery charger having the switching regulator without erroneous operation can be obtained.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. A charger for a rechargeable battery comprising:
   switching regulator means for producing regulated output voltage at a high frequency and which stops producing the regulated output voltage in response to an interrupting signal,
   cut-off means between said switching regulator and the rechargeable battery being charged which cuts off the voltage supplied to the battery in response to a cut-off signal,
   analog to digital convertor means for converting the measured voltage of the rechargeable battery into digital data,
   control means for producing at predetermined intervals the interrupting signal having a predetermined time length for the switching regulator said control means responsive to the output of the analog to digital convertor when the interrupting signal is produced for judging whether the charging is completed or not according to the output of the analog to digital convertor, and which issues the cut-off signal to the cut-off means when the charging is completed,
   detection means coupled to the battery for producing a detection signal when a charging voltage to the battery is larger than a predetermined threshold value, and
   timer means which is set by receiving the detection signal from the detection means, and which produces the cut-off signal for the cut-off means at a predetermined time after the setting of the timer means and is reset by stopping the charging voltage, said predetermined timer time being longer than the predetermined interval of the interrupting signal of the control means.

2. A battery charger in accordance with claim 1 wherein
   said cut-off means comprises a transistor coupled between the switching regulator and the battery.

3. A battery charger in accordance with claim 1 wherein
   said detection means comprises a comparator for comparing the charging voltage and the predetermined value.

* * * * *